United States Patent
Imamiya

(10) Patent No.: US 11,689,805 B2
(45) Date of Patent: Jun. 27, 2023

(54) IMAGE CAPTURING APPARATUS, METHOD OF CONTROLLING THE SAME, AND STORAGE MEDIUM

(71) Applicant: CANON KABUSHIKI KAISHA, Tokyo (JP)

(72) Inventor: Junichi Imamiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 17/074,346

(22) Filed: Oct. 19, 2020

(65) Prior Publication Data
US 2021/0120170 A1    Apr. 22, 2021

(30) Foreign Application Priority Data
Oct. 21, 2019    (JP) .................................. 2019-192135

(51) Int. Cl.
*H04N 23/67*    (2023.01)
*G06T 7/20*     (2017.01)
*H04N 5/30*     (2006.01)

(52) U.S. Cl.
CPC .............. *H04N 23/67* (2023.01); *G06T 7/20* (2013.01); *H04N 5/30* (2013.01); *G06T 2207/10004* (2013.01)

(58) Field of Classification Search
CPC .............. H04N 5/23212; H04N 5/30; H04N 5/232127; H04N 5/232945; H04N 5/232122; H04N 23/632; H04N 23/635; H04N 23/675; G06T 7/20; G06T 2207/10004; G06F 3/04845; G06F 3/04886; G06F 2203/04803; G06F 3/0488
See application file for complete search history.

(56) References Cited

U.S. PATENT DOCUMENTS

2015/0229831 A1 *    8/2015    Miyazawa ....... H04N 5/232127
                                                     348/222.1

FOREIGN PATENT DOCUMENTS

| JP | 08-15603 A | 1/1996 |
| JP | 2006-330567 A | 12/2006 |
| JP | 2015-232604 A | 12/2015 |

* cited by examiner

*Primary Examiner* — Lin Ye
*Assistant Examiner* — Tuan H Le
(74) *Attorney, Agent, or Firm* — Cowan, Liebowitz & Latman, P.C.

(57) ABSTRACT

An image capturing apparatus includes an image sensor configured to be able to output an image capturing signal and a focus detection image signal, a focus detection unit configured to set, on a screen of the image sensor, a focus detection range, and to perform focus detection, in each of a plurality of focus detection frames in the focus detection range, and a focus adjustment unit configured to perform a focus adjustment, during a shooting preparation operation and a shooting operation, based on an output of the focus detection unit, for tracking a subject, wherein the focus detection unit makes the focus detection range during the shooting operation broader than the focus detection range during shooting preparation operation.

8 Claims, 10 Drawing Sheets

IMAGE CAPTURING APPARATUS, METHOD OF CONTROLLING THE SAME, AND STORAGE MEDIUM

BACKGROUND OF THE INVENTION

Field of the Invention

The present invention relates to a technique for detecting focus in an image capturing apparatus.

Description of the Related Art

An AF (auto focus) method (imaging plane phase difference method) which, by embedding a phase difference detection function on an image sensor for capturing a subject image, makes it possible to detect a focus error amount on an image capturing plane of an image capturing lens in image capturing apparatuses is known. By using this technique, it becomes possible to make the AF track a subject while looking at an LV (live view) screen and perform continuous still image shooting.

In a case where continuous shooting is performed while looking at an LV image as described above, the LV image is outputted from an image capturing unit of a camera during a shooting preparation operation, which is started by half-pressing a shutter button, and a still image is outputted from the image capturing unit of the camera during a shooting operation, which is executed by fully pressing the shutter button. Therefore, an output image frame rate is different during the shooting preparation operation and the shooting operation. For example, while the output image frame rate during the shooting preparation operation is 120 fps, the frame rate slows during the shooting operation to 10 fps (10-frame continuous shooting). Therefore, a focus detection calculation period becomes long which then makes it easier for a moving subject to be excluded from a focus detection range.

Japanese Patent Laid-Open No. H8-015603 discloses a technique that divides a pair of electrical signal columns, which is used for adjusting focus, into a plurality of blocks and then calculates a defocus amount and determines a perspective conflict for each block. If it is determined that any one of the blocks is a perspective conflict, a defocus amount is calculated for a new block that includes a part of the perspective conflict block.

In Japanese Patent Laid-Open No. 2015-232604, a defocus amount of a plurality of regions including a predetermined region, which is used for adjusting focus, is calculated and then according to that defocus amount, a perspective conflict is determined. In a case where there is a perspective conflict, the region that is used for adjusting focus is changed to any one of the other regions that has been set from the predetermined region according to the defocus amount of each region.

In a case where a user unintentionally has excluded a primary subject from a focus detection area (hereinafter referred to as subject exclusion), a defocus amount for another subject is calculated and then the focus is adjusted in relation to this. Subject exclusion includes cases of exclusion when the focus is put on the background behind the primary subject (hereinafter referred to as focus is on the background) and cases of when the focus is put on a subject in front of the primary subject. Generally, unintentional subject exclusion is more often the case where the focus is on the background, like in the former, and in a case where the focus is put on a subject in front, like in the latter, it is often a case where the user has intentionally changed the subject.

Japanese Patent Laid-Open No. 2006-330567 discloses that whether a new subject is further or nearer than a previous subject is determined based on a detection result of the focus detection area, and in a case where the new subject is determined to be further than the previous subject, a predetermined time is set longer than in a case where it is determined to be closer. The predetermined time described above is a time over which focus is adjusted assuming that the subject that was being captured up until now is still being captured after it ceases to be reliable that the subject.

However, although Japanese Patent Laid-Open No. H8-015603 discloses that a focus detection calculation region, which is used for adjusting focus, is changed by determining a perspective conflict, it does not mention a difference between the focus detection calculation periods during the shooting preparation operation and the shooting operation. Therefore, the problem that the focus detection calculation period becomes longer during the continuous shooting operation than the shooting preparation operation thereby making it easier for a moving subject to move out of the focus detection calculation region is not disclosed.

Japanese Patent Laid-Open No. 2015-232604 does not mention, similarly to Japanese Patent Laid-Open No. H8-015603, the difference between the focus detection calculation period during the shooting preparation operation and the shooting operation. Therefore, the problem that the focus detection calculation period becomes longer during the continuous shooting operation than the shooting preparation operation thereby making it easier for a moving subject to move out of the focus detection calculation region is also not disclosed.

In Japanese Patent Laid-Open No. 2006-330567, even if it is known that a new subject is present in the vicinity and the predetermined time is set shorter than in a case where it is far, the focus cannot be adjusted to the new subject until that time has elapsed.

SUMMARY OF THE INVENTION

The present invention is made in view of the foregoing problems and improves subject focus tracking ability in continuous still image shooting operation.

According to a first aspect of the present invention, there is provided an image capturing apparatus comprising: an image sensor configured to be able to output an image capturing signal, in which a subject image is captured, and a focus detection image signal, for which light that has passed through regions with different exit pupils of an imaging optical system has been photoelectrically converted; and at least one processor or circuit configured to function as: a focus detection unit configured to set, on a screen of the image sensor, a focus detection range for performing focus detection, and to perform focus detection, in each of a plurality of focus detection frames in the focus detection range, based on the focus detection image signal; and a focus adjustment unit configured to perform a focus adjustment, during a shooting preparation operation and a shooting operation, based on an output of the focus detection unit, for tracking a subject, wherein the focus detection unit makes the focus detection range during the shooting operation broader than the focus detection range during shooting preparation operation.

According to a second aspect of the present invention, there is provided an image capturing apparatus, comprising:

an image sensor configured to be able to output an image capturing signal, in which a subject image is captured, and a focus detection image signal, for which light that has passed through regions with different exit pupils of an imaging optical system has been photoelectrically converted; and at least one processor or circuit configured to function as: a focus detection unit configured to set, on a screen of the image sensor, a focus detection range for performing focus detection, and to perform focus detection, in each of a plurality of focus detection frames in the focus detection range, based on the focus detection image signal; and a focus adjustment unit configured to perform focus adjustment, during a shooting operation, based on an output of the focus detection unit, for tracking a subject, wherein the focus adjustment unit changes, in a case where a count is equal to or greater than a predetermined value or a time is equal to or greater than a threshold for a close-range ratio, which is a ratio of the number of the focus detection frames in which a focus detection result indicates a close-range side that is closer than a subject that focus adjustment is made to track, to a total number of focus detection frames, focus adjustment so as to make the focus adjustment track a subject on the close-range side.

According to a third aspect of the present invention, there is provided a method for controlling an image capturing apparatus including an image sensor configured to be able to output an image capturing signal, in which a subject image is captured, and a focus detection image signal, for which light that has passed through regions with different exit pupils of an imaging optical system has been photoelectrically converted, the method comprising: setting, on a screen of the image sensor, a focus detection range for performing focus detection and performing focus detection in each of a plurality of focus detection frames in the focus detection range, based on the focus detection image signal; and performing a focus adjustment, during a shooting preparation operation and a shooting operation, based on an output of the focus detection, for tracking a subject, wherein in the focus detection, the focus detection range during the shooting operation is set to be broader than the focus detection range during shooting preparation operation.

According to a fourth aspect of the present invention, there is provided a method for controlling an image capturing apparatus including an image sensor configured to be able to output an image capturing signal, in which a subject image is captured, and a focus detection image signal, for which light that has passed through regions with different exit pupils of an imaging optical system has been photoelectrically converted, the method comprising: setting, on a screen of the image sensor, a focus detection range for performing focus detection and performing focus detection in each of a plurality of focus detection frames in the focus detection range, based on the focus detection image signal; and performing a focus adjustment, during a shooting operation, based on an output of the focus detection, for tracking a subject, wherein, in the focus adjustment, in a case where a count is equal to or greater than a predetermined value or a time is equal to or greater than a threshold for a close-range ratio, which is a ratio of the number of the focus detection frames in which a focus detection result indicates a close-range side that is closer than a subject that focus adjustment is made to track, to a total number of focus detection frames, focus adjustment is changed so as to make the focus adjustment track a subject on the close-range side.

Further features of the present invention will become apparent from the following description of exemplary embodiments with reference to the attached drawings.

DESCRIPTION OF THE EMBODIMENTS

Figure 1:
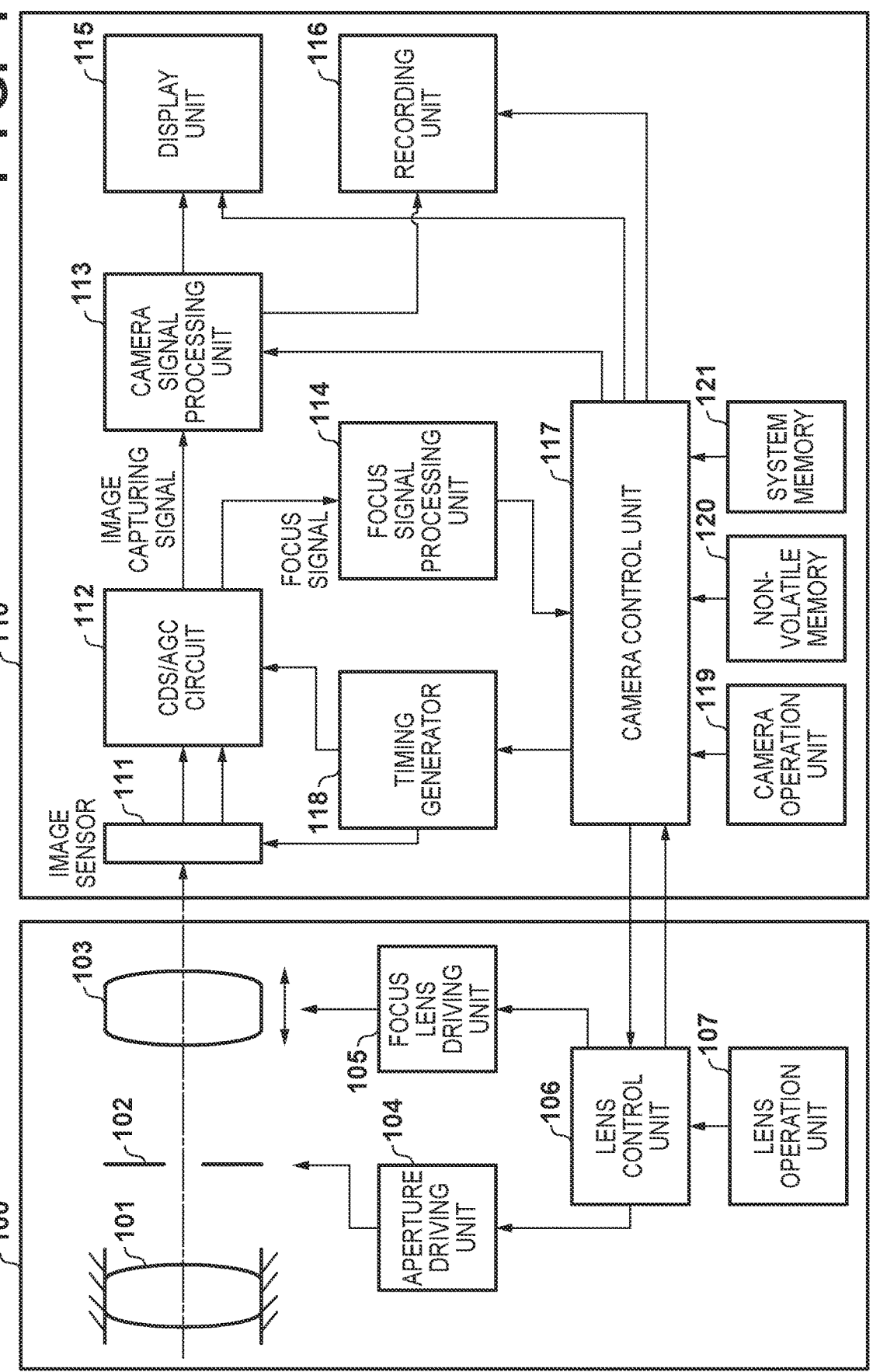
FIG. 1 is a block diagram illustrating an overview configuration of an image capturing system in a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<Configuration of Image Capturing System>

FIG. 1 is a block diagram illustrating an overview configuration of an image capturing system comprising a continuous still image shooting function by AF tracking in a first embodiment of an image capturing apparatus of the present invention. Note that in the present embodiment, although the image capturing apparatus is described as an image capturing system in which lenses are interchangeable, it may also include a fixed lens.

As illustrated in FIG. 1, the image capturing system in the present embodiment comprises a lens unit 100 and a camera main body 110. A lens control unit 106 that comprehensively controls operation of the entirety of the lens unit 100 and a camera control unit 117 that controls operation of the entirety of the image capturing system exchange data via communication.

First, a configuration of the lens unit 100 is described.

The lens unit 100 includes an imaging optical system comprising a fixed lens 101, an aperture 102, a focus lens 103, a zoom lens (not illustrated), and such. The aperture 102 is driven by an aperture driving unit 104 and controls an amount of incident light on an image sensor 111 described later. The focus lens 103 is driven by a focus lens driving unit 105 and is used for adjusting focus. The zoom lens (not illustrated) is driven by a zoom lens driving unit and is used for adjusting an angle of view. Note that in the present embodiment, the zoom lens and the zoom lens driving unit are not a necessary configuration and may be absent.

The aperture driving unit 104, the focus lens driving unit 105, and the zoom lens driving unit are controlled by the lens control unit 106, which controls an opening diameter of the aperture 102 or positions of the focus lens 103 and the zoom lens. In a case where a focus ring, a zoom ring, or such comprised in a lens operation unit 107 is operated by a user and an instruction such as focus adjustment or zoom adjustment has been performed, the lens control unit 106 performs control in relation to the user operation. Note that a focus ring in the present embodiment is a rotary encoder that issues an electrical signal, a pulse signal is generated in relation to a rotation operation, and then this pulse signal is sent to the camera control unit 117 described later. The camera control unit 117 sends a drive control signal of the focus lens 103 to the lens control unit 106 based on the pulse signal received from the focus ring. The lens control unit 106 controls the aperture driving unit 104, the focus lens driving unit 105, and the zoom lens driving unit in relation to a control command or control information received from the camera control unit 117 and sends lens information to the camera control unit 117. The focus lens driving unit 105 drives the lens using a driving unit such as a motor, an actuator, or such.

Next, a configuration of the camera main body 110 is described.

In the camera main body 110, the image sensor 111 is comprised by a CCD or a CMOS sensor, and light flux that has passed through an imaging optical system of the lens unit 100 forms an image on a light receiving surface of the image sensor 111. Then, a subject image that is formed is photoelectrically converted by a photodiode (photoelectric conversion unit) of the image sensor 111 into an electric charge in relation to the amount of incident light and then is held. The electric charge held in each photodiode, based on a driving pulse provided from a timing generator 118 according to a command from the camera control unit 117, is sequentially read from the image sensor 111 as a voltage signal in relation to the electric charge. Note that a detailed configuration of the image sensor 111 is described later and that the image sensor 111 in the present embodiment is able to output a pair of focus signals, which can be used for detecting focus in a phase difference detection method, in addition to a normal image capturing signal.

The image capturing signal and the focus signal read from the image sensor 111 are inputted to a CDS/AGC circuit 112, and correlated double sampling for removing reset noise, gain adjustment, and signal digitization are performed. The CDS/AGC circuit 112 outputs the processed image capturing signal to a camera signal processing unit 113 and the focus signal to a focus signal processing unit 114.

The camera signal processing unit 113 executes various image processing on the image capturing signal outputted from the CDS/AGC circuit 112 and generates a video signal. A display unit 115 includes a display device such as an LCD or organic EL and displays an image based on the video signal outputted from the camera signal processing unit 113. Also, in a case of a recording mode in which an image capturing signal is recorded, the image capturing signal is sent from the camera signal processing unit 113 to a recording unit 116 and then is recorded on a recording medium such as an optical disk, a semiconductor memory (memory card), or a magnetic tape.

The focus signal processing unit 114 performs a correlation calculation based on the pair of focus signals outputted from the CDS/AGC circuit 112 and then detects a focus state. Here, a correlation amount, a defocus amount, and reliability information (two-image coincidence, two-image steepness, contrast information, saturation information, damage information, etc.) are calculated. Then, the calculated defocus amount and reliability information are outputted to the camera control unit 117. Also, the camera control unit 117 notifies, based on the acquired defocus amount, the reliability information, and such, the focus signal processing unit 114 to change a setting for calculating them.

The camera control unit 117 controls by exchanging information with each of the blocks in the camera main body 110. Also, in addition to processing in the camera main body 110, operations are received from the user and in relation to an input from a camera operation unit 119 operated by the user, on/off of power, setting changes, and recording are controlled. Also, as described above, information is exchanged with the lens control unit 106 in the lens unit 100, a control command and control information of the imaging optical system is transmitted, and information inside the lens unit 100 is acquired.

The camera control unit 117 carries out each of the processing of the present embodiment later described by executing a program recorded in a non-volatile memory 120. A system memory 121 is for example, a RAM, and the camera control unit 117 loads constants and variables for operating the camera control unit 117, programs read from the non-volatile memory 120, and such into the system memory 121.

The non-volatile memory 120 is a memory that can be electronically cleared/recorded, and an EEPROM is used, for example. In the non-volatile memory 120, constants for operating the camera control unit 117, programs, and such are recorded (stored). A program in this context is a program for executing the various flowcharts described later in the present embodiment.

<Configuration of Image Sensor>

Figure 2:
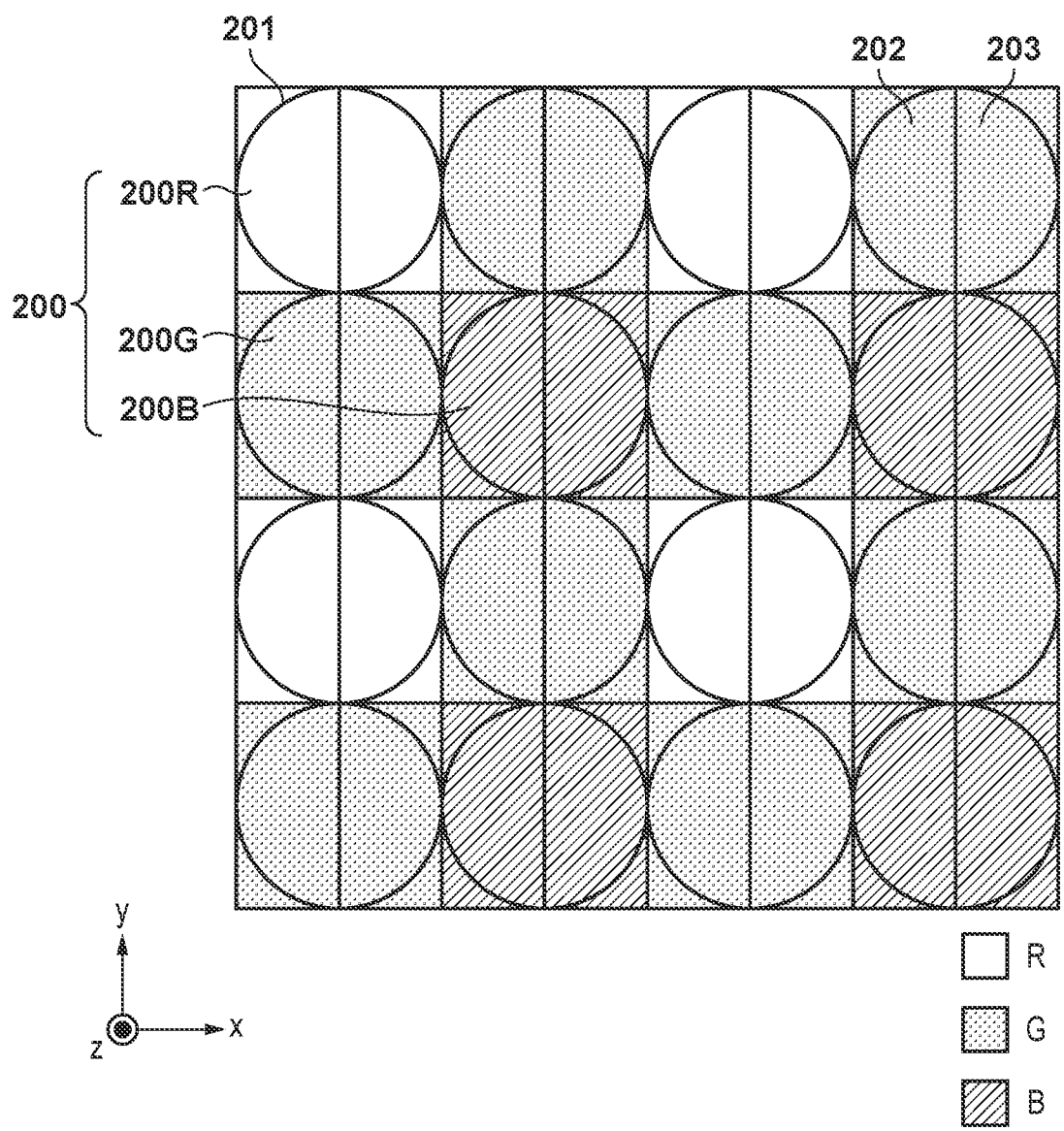
FIG. 2 is a schematic diagram of a pixel array of an image sensor in the first embodiment.

FIG. 2 is a diagram schematically illustrating a pixel array of the image sensor 111 in the present embodiment.

FIG. 2 is the pixel array of a two-dimensional CMOS sensor used as the image sensor 111 in the present embodiment illustrated with image capturing pixels in a 4-column-by-4-row range (in terms of a focus detection pixel array, an 8-column-by-4-row range).

In the present embodiment, a pixel group 200 comprises of 2-column-by-2-row pixels and is assumed to be covered by a Bayer array color filter. In the pixel group 200, a pixel group 200 R, which includes R (red) spectral sensitivity, is arranged on a top-left position, a pixel group 200 G, which includes G (green) spectral sensitivity, is arranged on a top-right and a bottom-left positions, and a pixel group 200 B, which includes B (blue) spectral sensitivity, is arranged on a bottom-right position. Furthermore, each pixel of the image sensor 111 in the present embodiment has a plurality of photodiodes (photoelectric conversion units) for one microlens 201 for performing focus detection using the imaging plane phase difference method. In the present embodiment, it is assumed that each pixel comprises two photodiodes 202 and 203 which are arranged in 2 columns×1 row. By this, an exit pupil of the imaging optical system can be divided, and then a focus detection signal can be outputted.

The image sensor 111 makes it possible to acquire the image capturing signal and the focus signal by arranging a large number of pixel groups 200, which comprises 2-column×2-row pixels (4-column-by-2-row photodiodes) illustrated in FIG. 2, on the image capturing plane.

In each pixel having such a configuration, the light flux is divided by the microlens 201 and is imaged by the photodiodes 202 and 203. Then, a sum of signals (A+B signal) from the two photodiodes 202 and 203 is used as the image capturing signal and two signals (A image signal and B image signal) each read from their respective photodiodes 202 and 203 are used as the focus signal. Note that although the image capturing signal and the focus signal may be read separately, configuration may be taken as follows taking the processing load into account. In other words, the image capturing signal (A+B signal) and either one (e.g., A signal) of the focus signals of the photodiodes 202 and 203 may be read and then the other focus signal (e.g., B signal) may be acquired by taking a difference.

Note that in the present embodiment, although each pixel is configured to comprise two photodiodes 202 and 203 for one microlens 201, the number of photodiodes is not limited to two and there may also be greater than or equal to that number of photodiodes. Also, an aperture position of a light receiving unit may include a plurality of different pixels for the microlens 201. That is, any configuration may be taken as long as two signals such as the A image signal and the B image signal for detecting a phase difference by which a phase difference can be detected is obtained as a result.

Also, although a configuration in which all of the pixels include a plurality of photodiodes is illustrated in FIG. 2, limitation is not made to this and configuration may be such that the focus detection pixels, similarly to what is illustrated in FIG. 2, are configured discretely in a normal pixel comprising the image sensor 111.

Control executed by the camera control unit 117 in the present embodiment for shooting a still image while AF tracking is described below with reference to FIGS. 3 to 7. In the present embodiment, in shooting a still image by AF tracking, a focus detection calculation frame size per frame is changed between when in the shooting preparation operation and when in the shooting operation.

Note that in the present embodiment, by half-pressing a release button (turning on a switch SW 1) arranged on the camera operation unit 119, a shooting preparation operation such as AF (auto focus) and AE (automatic exposure control) is performed. Also, by fully pressing the above release button (turning on a switch SW 2), an actual shooting operation is executed.

Figure 3:
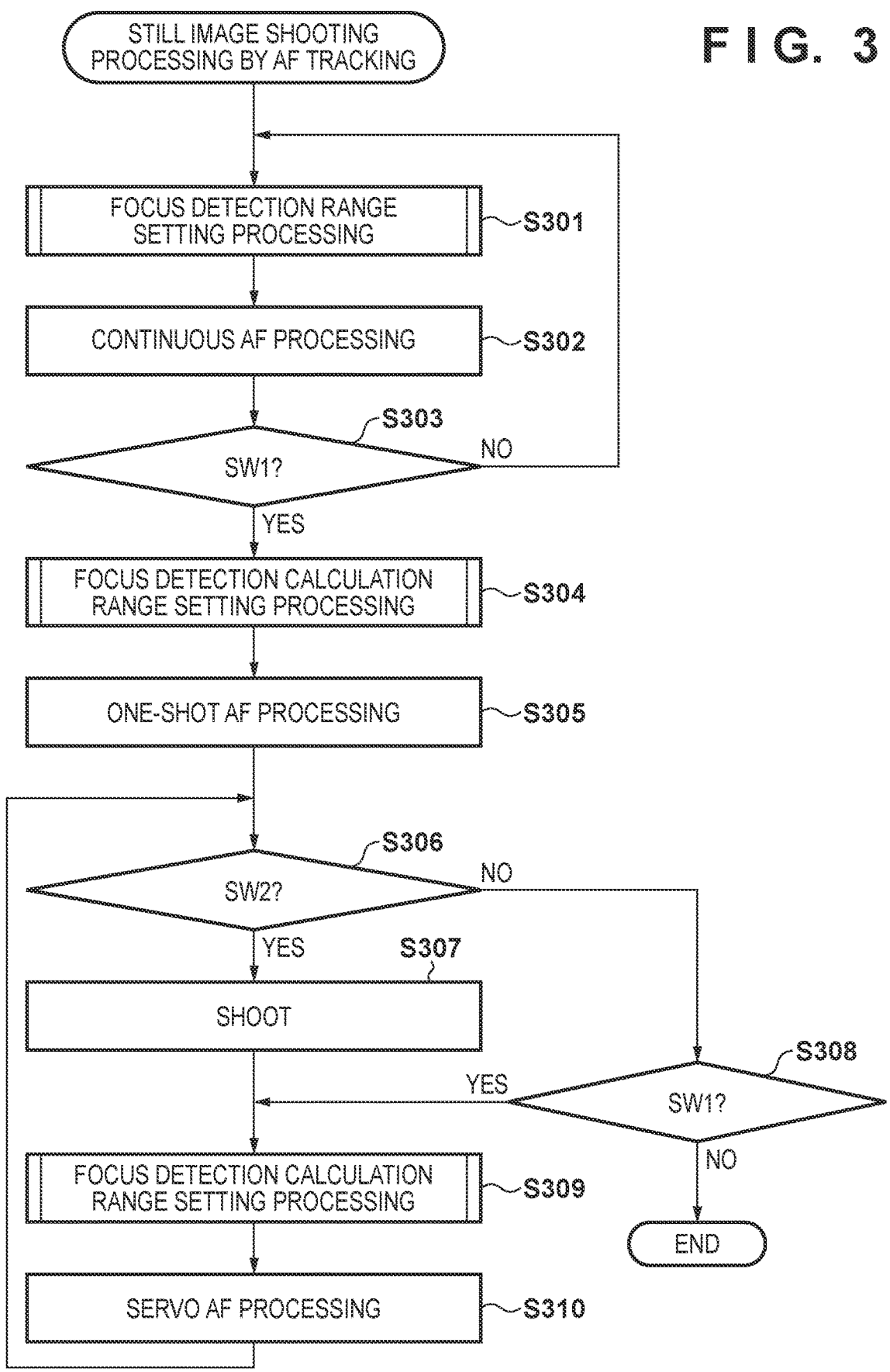
FIG. 3 is a flowchart illustrating still image shooting processing in the first embodiment.
Figure 4:
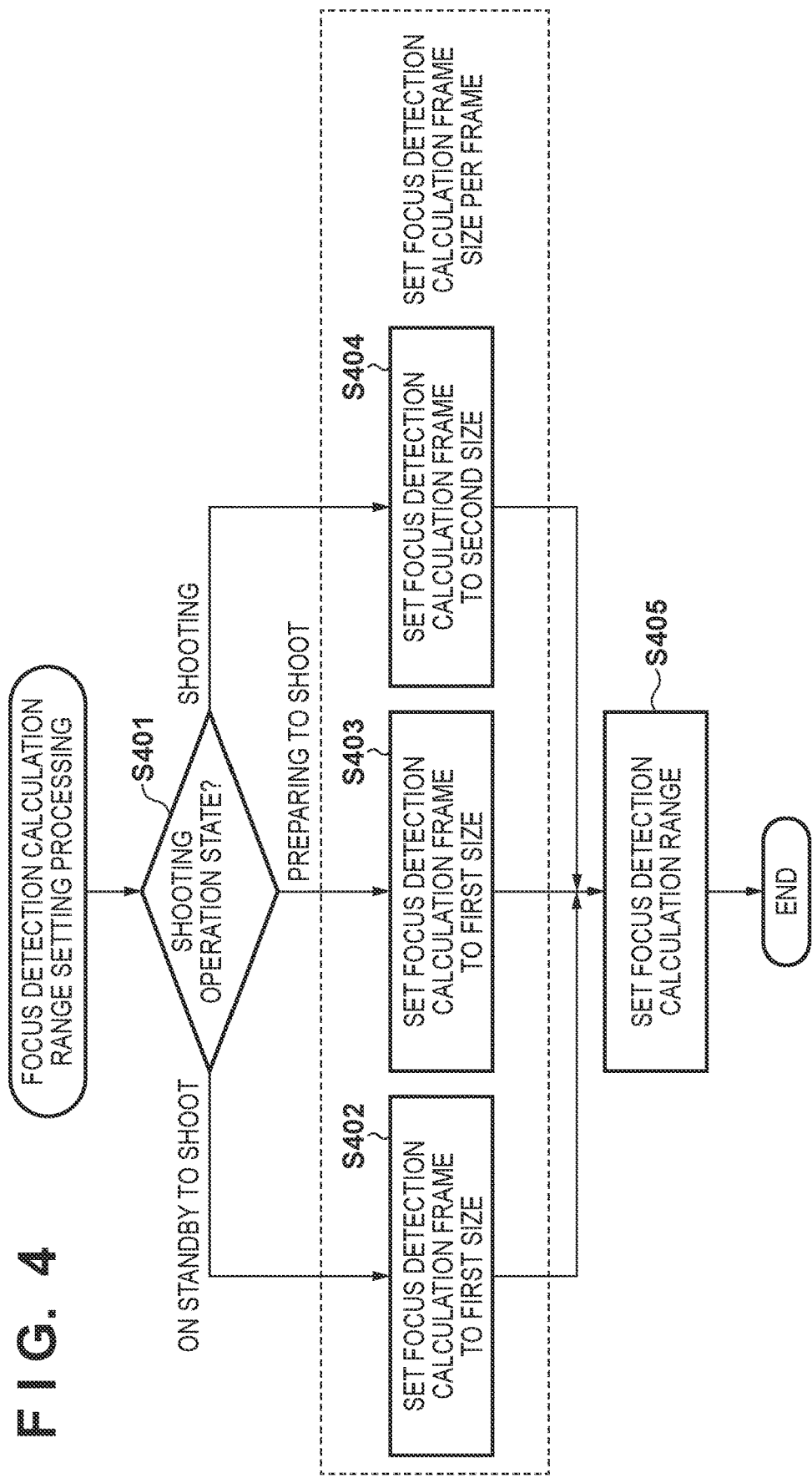
FIG. 4 is a flowchart illustrating focus detection calculation range setting in the first embodiment.
Figure 5:
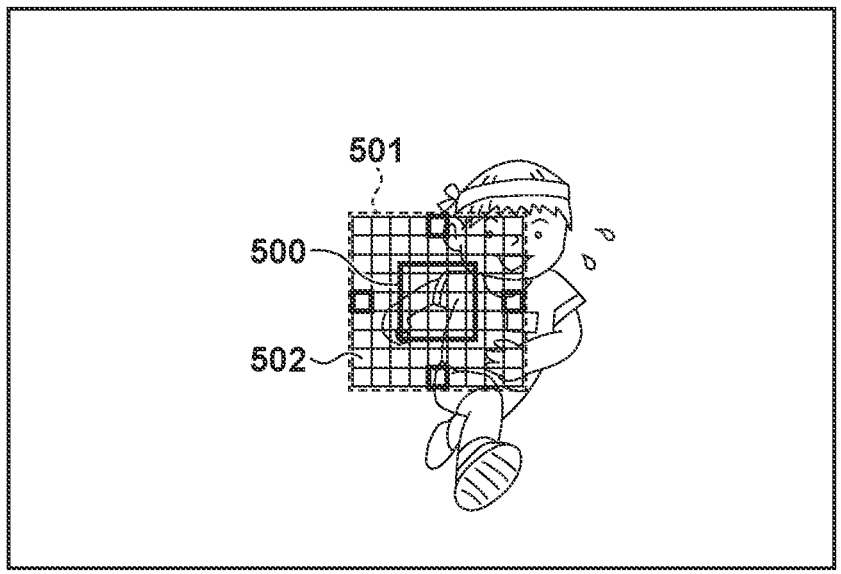
FIG. 5 is a diagram illustrating a relationship between a focus detection calculation frame and a focus detection display frame.
Figure 6:
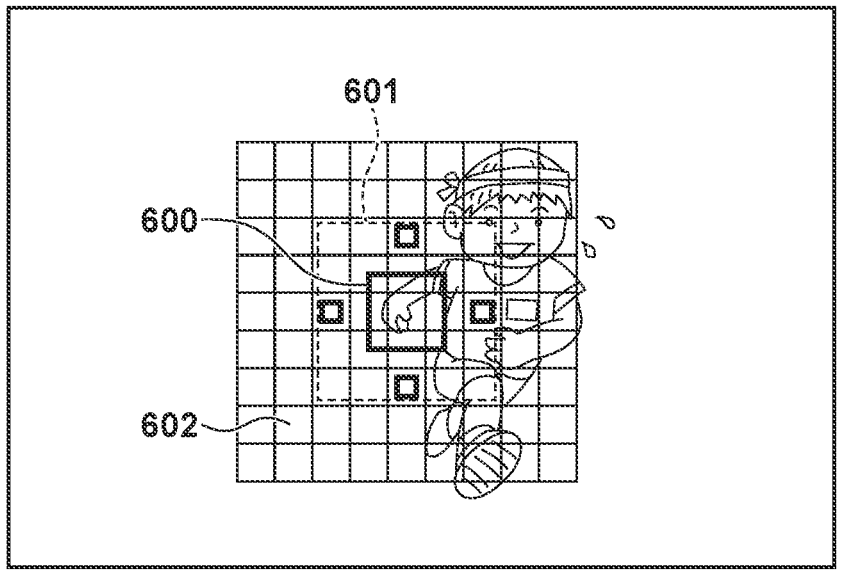
FIG. 6 is a diagram illustrating a relationship between a focus detection calculation frame and a focus detection display frame.
Figure 7:
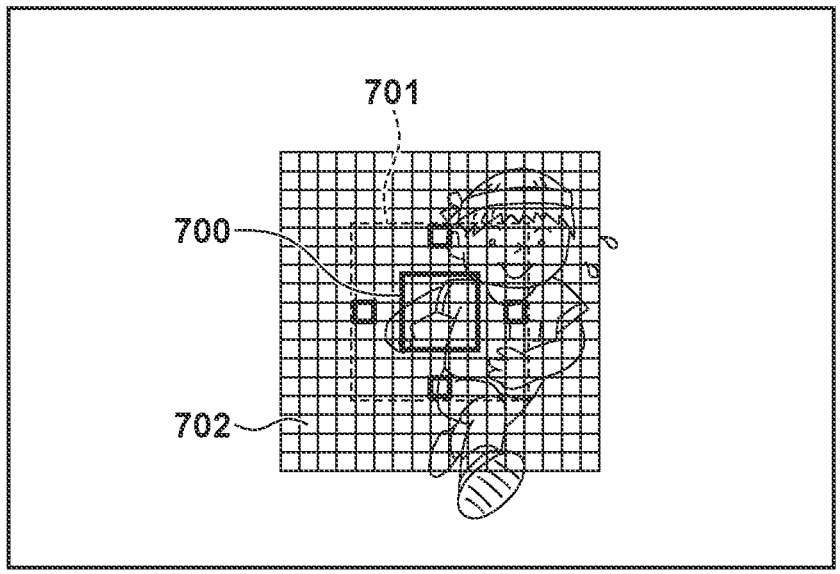
FIG. 7 is a diagram illustrating a relationship between a focus detection calculation frame and a focus detection display frame.

FIG. 3 is a flowchart related to still image shooting processing by AF tracking in the present embodiment. FIG. 4 is a flowchart related to focus detection calculation range setting processing in the present embodiment. FIG. 5 is a diagram illustrating an example of a relationship between the focus detection calculation frame and the focus detection display frame displayed in the finder during the shooting preparation operation in a case where a focus detection calculation frame size per frame is changed in the embodiment. FIG. 6 is a diagram illustrating an example of a relationship between the focus detection calculation frame and the focus detection display frame during the shooting operation in a case where a focus detection calculation frame size per frame is changed in the embodiment. FIG. 7 is a diagram illustrating an example of a relationship between the focus detection calculation frame and the focus detection display frame during the shooting operation in a case where a number of focus detection calculation frames is changed in the present embodiment.

The still image shooting processing by AF tracking is described with reference to FIG. 3. Processing of the flowchart in FIG. 3 is assumed to start when the camera main body 110 is powered on, and without the release button being operated, only an instruction to perform a live view operation is made (shooting standby state or shooting standby).

First, in step S301, the camera control unit 117 performs focus detection calculation range setting processing for deciding a region for performing focal point adjustment processing described later. The focus detection calculation range setting processing is described later in detail.

In step S302, the camera control unit 117 performs continuous AF processing that constantly performs approximate focus adjustment. This makes it possible to quickly stop focusing when performing one-shot AF processing.

In step S303, the camera control unit 117 determines whether the release button was half-pressed by the user and then the shooting preparation operation was instructed. In a case where it was determined that the shooting preparation operation was instructed, the processing advances to step S304, and otherwise, the processing returns to step S301.

In step S304, the camera control unit 117 performs focus detection calculation range setting processing for deciding a region for performing focal point adjustment processing similarly to in step S301.

In step S305, the camera control unit 117 performs one-shot AF processing which performs focus adjustment only once in the focus detection calculation range set in step S304. Focus adjustment drives the focus lens when not in a focus stop state and determines a focus stop.

In step S306, the camera control unit 117 determines whether the release button was fully pressed by the user and then the shooting operation was instructed. In a case where it was determined that the shooting operation was instructed, the processing advances to step S307, and otherwise, the processing advances to step S308.

In step S307, still image is shot.

In step S308, the camera control unit 117 determines whether the shooting preparation operation was instructed by the user. In a case where it is determined that the shooting preparation operation is instructed (applies to an operation for maintaining the shooting preparation operation and an operation for switching from the shooting operation to the shooting preparation operation), the processing advances to step S309, and otherwise, the present flowchart processing is ended.

In step S309, the camera control unit 117 performs the focus detection calculation range setting processing similarly to in steps S301 and S304.

In step S310, the camera control unit 117 performs servo AF processing for continuously performing focus adjustment in the focus detection calculation range set in step S309. Then, the processing returns to step S306. If the user continues to fully press down on the release button in order for the shooting operation to continuously be executed, still images will continuously be shot.

The focus detection calculation range setting processing performed in steps S301, S304, and S309 in FIG. 3 is described below with reference to the flowchart in FIG. 4.

In step S401, the camera control unit 117 determines whether a state is a shooting standby state, a shooting preparation operation state, or a shooting operation state. In a case where it is determined to be in the shooting standby state, the processing advances to step S402, in a case where it is determined to be in the shooting preparation operation state, the processing advances to step S403, and in a case where it is determined to be in the shooting operation state, the processing advances to step S404.

In steps S402 to S404, the camera control unit 117 sets the focus detection calculation frame size per frame. A second size, which is the focus detection calculation frame size in the shooting operation state is set to be greater than a first size, which is the focus detection calculation frame size in the shooting preparation operation state. Note that although the focus detection calculation frame size in the shooting standby state is made to be the first size, which is the same as in a case of the shooting preparation operation state, the size may also be different. Also, instead of changing the focus detection calculation frame size per frame, the number of focus detection calculation frames may also be set differently.

In step S405, the camera control unit 117 sets, based on the focus detection calculation frame size per frame set in any one of steps S402 to S404, the entire focus detection calculation range comprising a plurality of frames.

FIGS. 5, 6, and 7 are diagrams illustrating the focus detection display frame, the focus detection display frame range, and the focus detection calculation frame. In FIGS. 5, 6, and 7, focus detection display frames 500, 600, and 700, focus detection display frame ranges 501, 601, and 701, and focus detection calculation frame ranges 502, 602, and 702 set by the user are illustrated. A plurality of focus detection calculation frames are arranged in the focus detection calculation frame range (in the focus detection range).

FIGS. 5 and 6 are diagrams illustrating examples for setting the focus detection calculation frame (focus detection frame) size per frame described in steps S402 to S404. The focus detection calculation frame size per frame is changed so that during the shooting preparation operation, the focus detection calculation frame range 502 is inside the range of the focus detection display frame range 501 and during the shooting operation, the focus detection calculation frame range 602 is broader than the focus detection display frame range 601. Then in step S405, the entire focus detection calculation ranges 502 and 602 are set. FIG. 7 is a diagram illustrating an example in a case where the number of focus detection calculation frames is set in steps S402 to S404. During the shooting preparation operation, the state is that of FIG. 5 and during the shooting operation, the number of focus detection calculation frames is increased so that the focus detection calculation frame range 702 is broader than the focus detection display frame range 701. Then in step S405, the entire focus detection calculation range 702 is set. Note that in the description above, although it is described that the focus detection display frame range 501 does not change even if the focus detection calculation frame ranges 602 and 702 are broadened, the focus detection display frame range 501 may be configured so that it becomes broader in relation to the focus detection calculation frame.

As previously described in the section regarding the conventional technique, in a case where continuous shooting is performed while looking at a live view (LV) image on a camera capable of imaging plane phase difference AF, during the shooting preparation operation, the LV image is outputted from an image capturing unit of the camera and during the shooting operation, a still image is outputted from the image capturing unit of the camera. Therefore, an output image frame rate is different during the shooting preparation operation and the shooting operation. For example, while the output image frame rate during the shooting preparation operation is 120 fps, the frame rate slows during the shooting operation to 10 fps (10-frame continuous shooting). Therefore, a focus detection calculation period becomes long which then makes it easier for a moving subject to be excluded from a focus detection range.

In relation to such a problem, in the present embodiment, during continuous still image shooting, a focus detection calculation range that is broader than the focus detection display frame is set for the moving subject. In other words, the focus detection calculation range is set to be broader during the continuous still image shooting than the shooting preparation operation. By this, the focus detection calculation period becomes longer during the shooting operation than the shooting preparation operation so that even if a main subject easily goes out of the focus detection display frame, AF tracking can be performed without losing sight of the main subject.

Second Embodiment

A second embodiment is described below. Conventionally, servo AF control in continuous shooting performs control so that once focus is adjusted to the main subject, that subject is locked onto and then the focus is continuously adjusted (hereinafter referred to as a lock-on). In that case, once a subject is locked onto, when a new main subject is found, whether a current lock-on subject and the new subject are the same subject is determined. Then, in a case where the subjects are determined not to be the same, the lock-on is released and then control is made to focus on the new main subject. In that case, a predetermined determination time is required to determine that the subjects are not the same. Conventionally, the lock-on could not be changed to a new subject during this same subject determination time. In other words, even if the subject that had been locked onto up until that point was an incorrect subject, it would take time until that was corrected.

In contrast to this, in the present embodiment, in still image shooting by AF tracking, if a close-range subject presence (when a subject is present at a distance closer than the distance to which the focus is currently adjusted) count (or time) is equal to or greater than a predetermined value, then the lock-on is changed to a new subject even during the same subject determination time. In other words, in a case where another subject is detected closer than the current lock-on subject many times or for a long time, that subject is determined to be the correct subject and the lock-on is changed to that subject.

Figure 8:
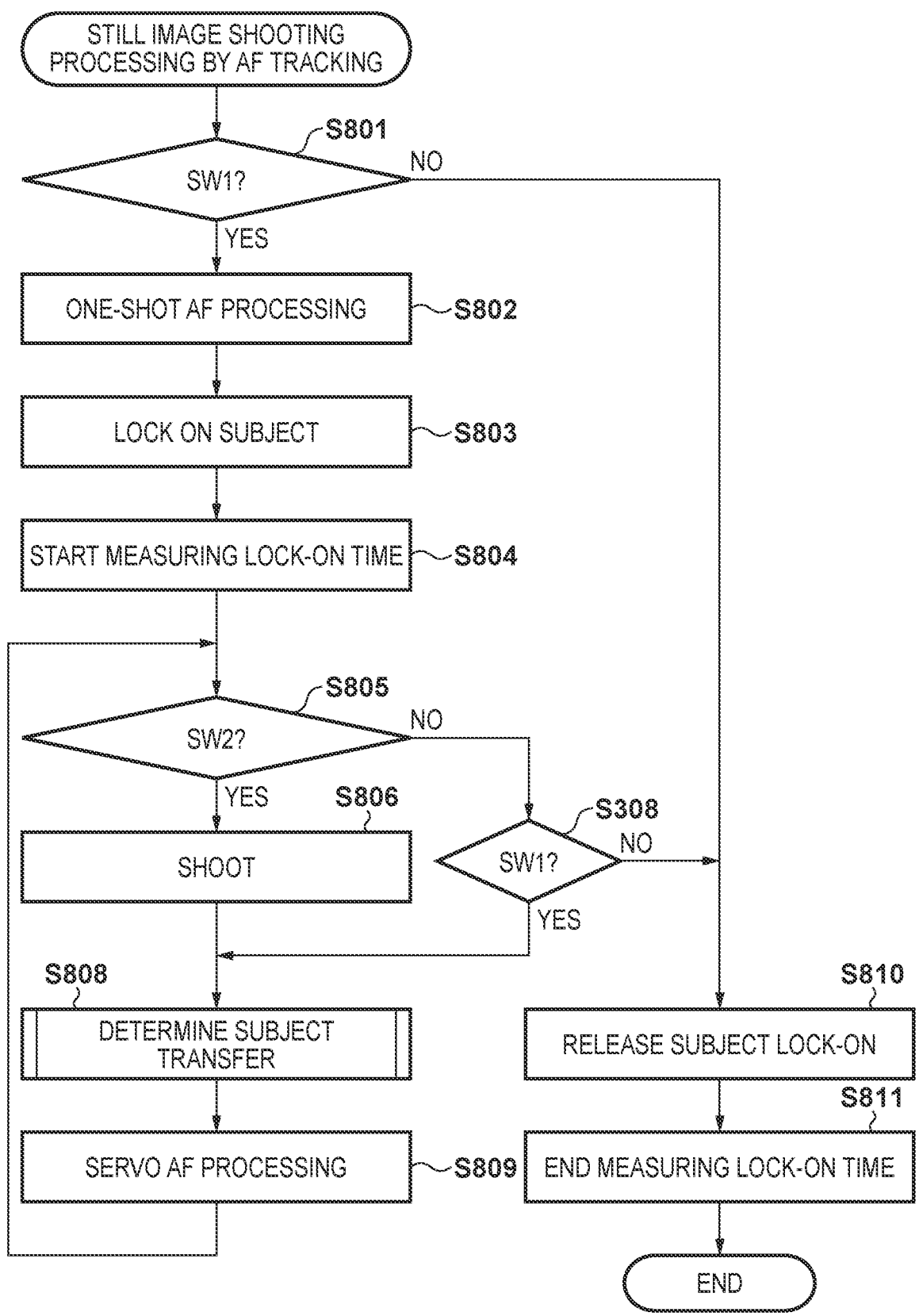
FIG. 8 is a flowchart illustrating still image shooting processing in a second embodiment.
Figure 9:
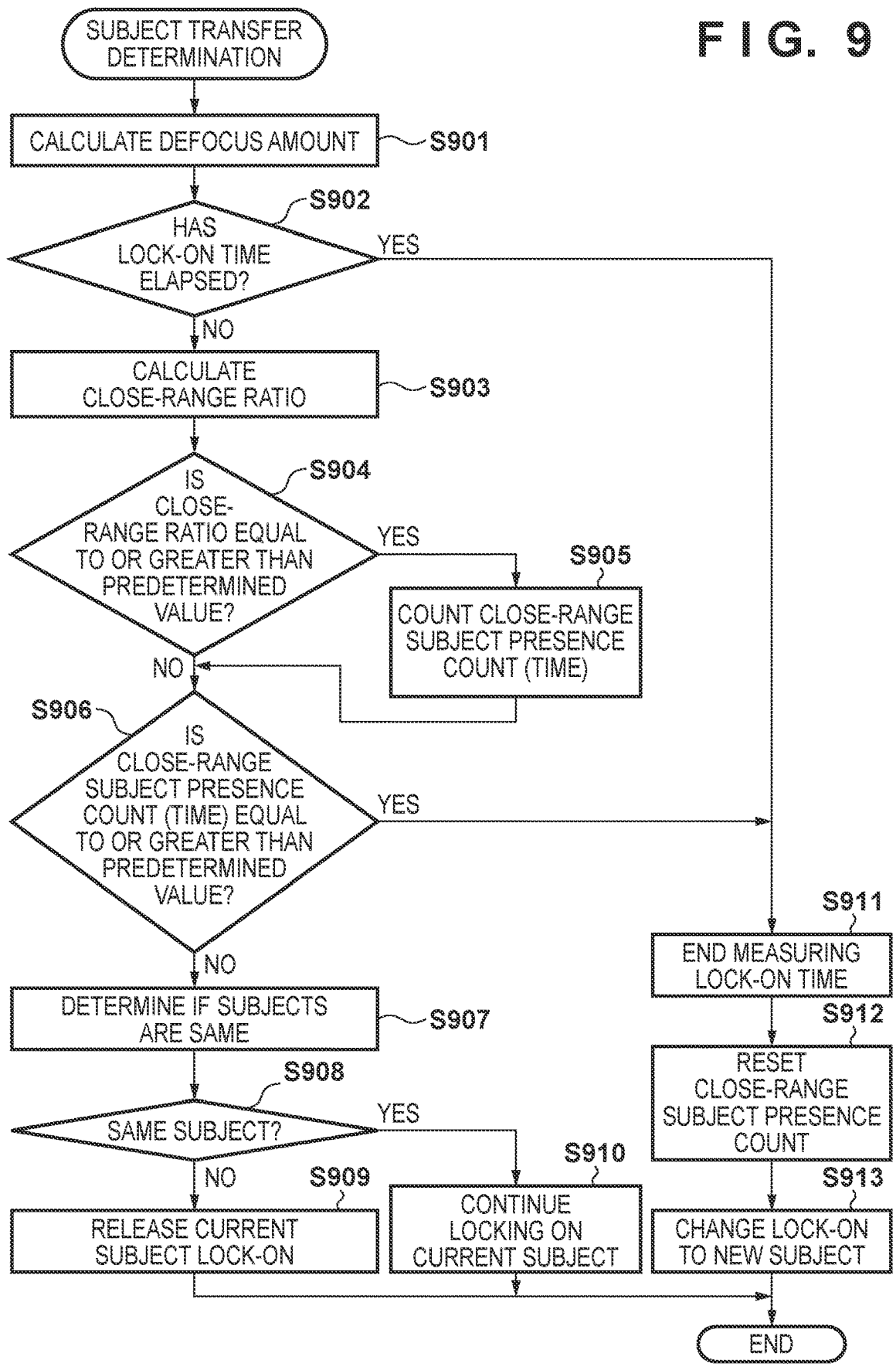
FIG. 9 is a flowchart illustrating subject transfer determination processing.
Figure 10:
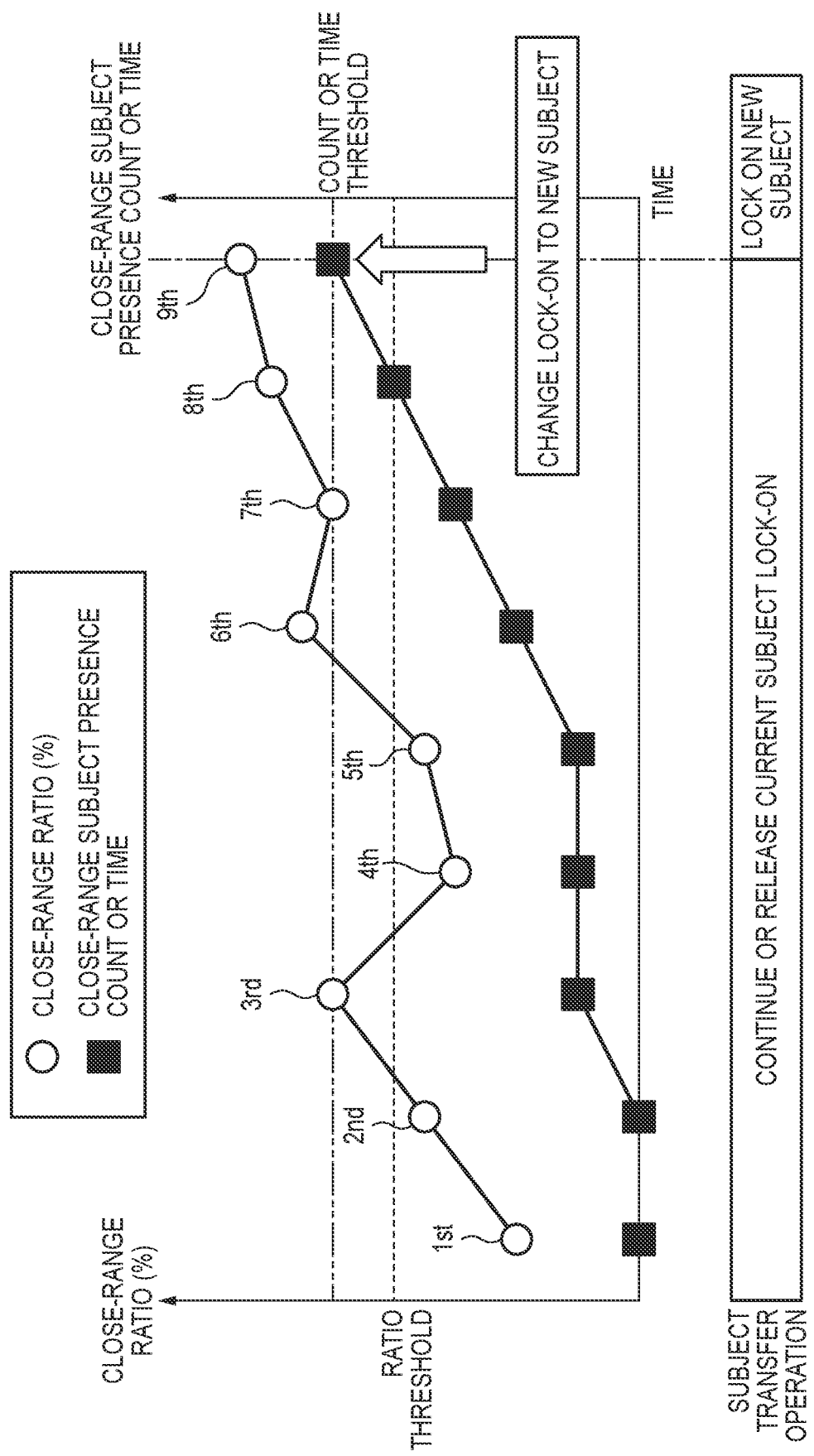
FIG. 10 is a diagram illustrating determination of a close-range subject presence count (time).
Figure 11:
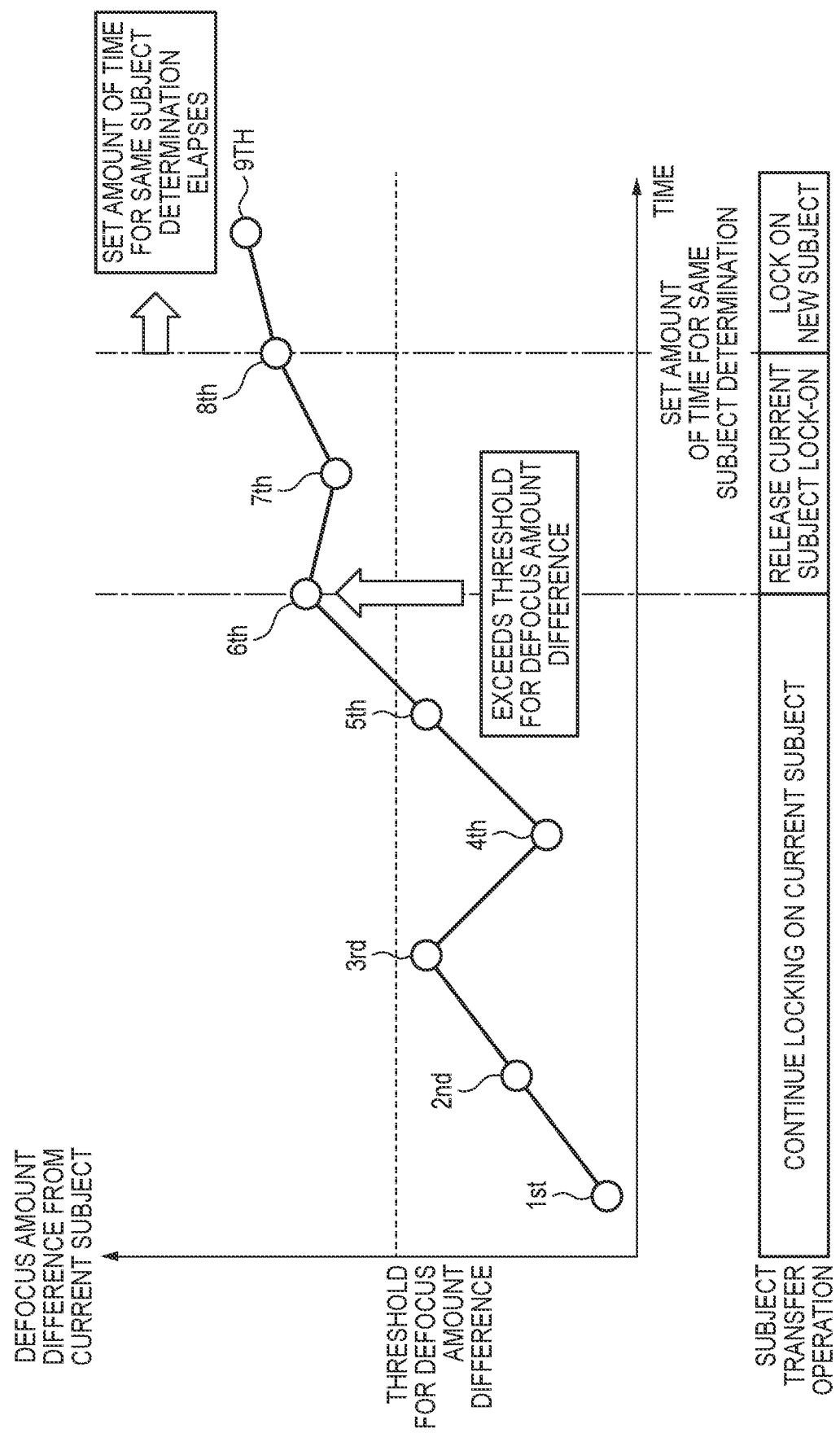
FIG. 11 is a diagram illustrating operation for same subject determination.
Figure 12:
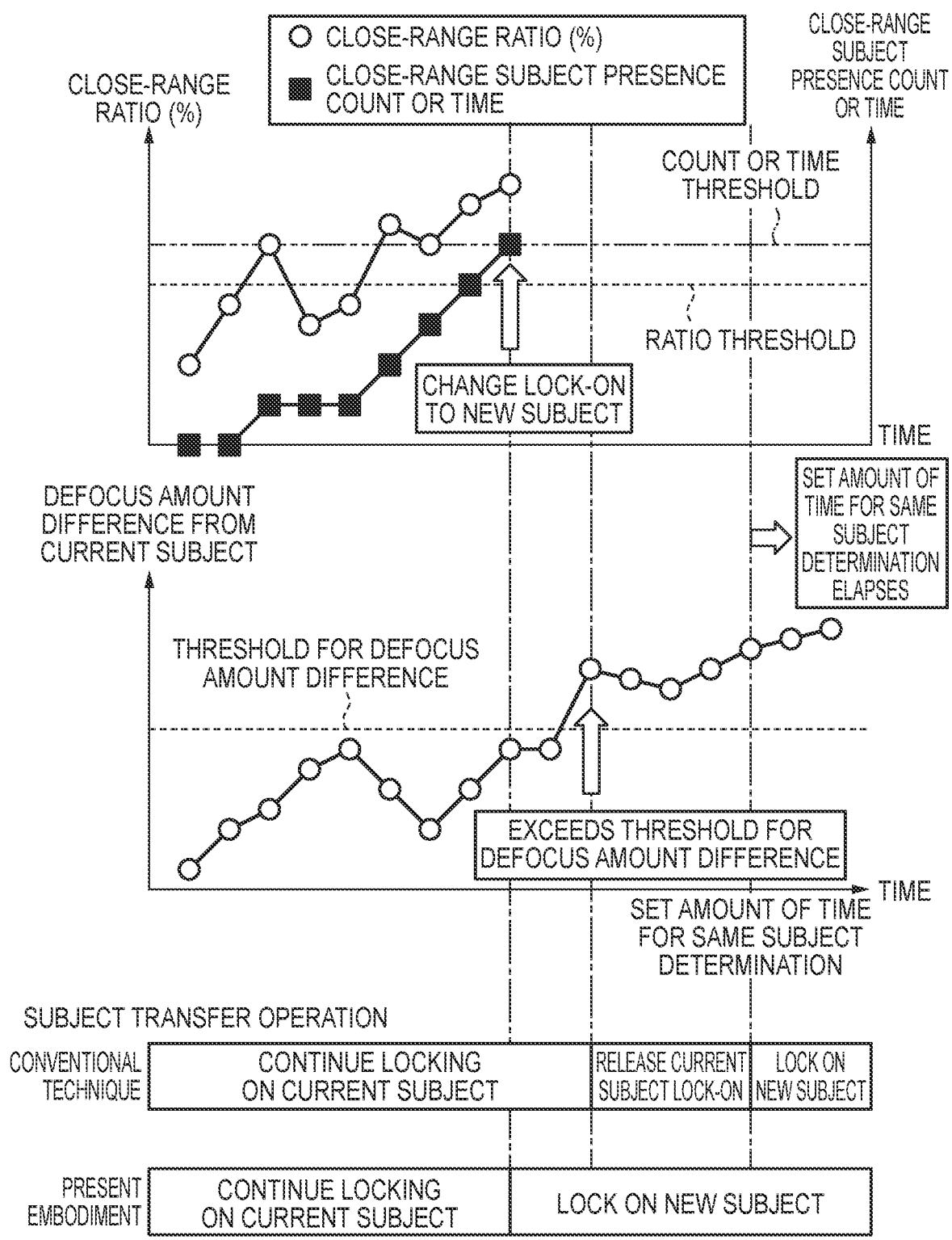
FIG. 12 is a diagram comparing the subject transfer determination of the second embodiment and conventional subject transfer determination.

FIG. 8 is a flowchart related to still image shooting processing by AF tracking in the present embodiment. FIG. 9 is a flowchart related to subject transfer determination processing in the present embodiment. FIG. 10 is a diagram illustrating an example of a subject transfer operation according to a close-range subject presence count (or time) determination according to the present embodiment. FIG. 11 is a diagram illustrating an example of subject transfer operation by the same subject determination. FIG. 12 is a diagram comparing the subject transfer determination of the second embodiment and conventional subject transfer determination.

First, still image shooting processing by AF tracking according to the present embodiment is described with reference to FIG. 8.

In step S801, the camera control unit 117 determines whether the release button was half-pressed by the user and then the shooting preparation operation was instructed. In a case where it was determined that the shooting preparation operation was instructed, the processing advances to step S802, and otherwise, the processing advances to step S810.

In step S802, the camera control unit 117 performs one-shot AF processing that performs focus adjustment only once. Focus adjustment drives the focus lens when not in a focus stop state and determines a focus stop.

In step S803, the camera control unit 117 locks onto (locks-on, as described above) the subject positioned where the focus is stopped.

In step S804, since the state is subject lock-on, measurement of elapsed time from the lock-on is started. Until the lock-on is released, the subject is continuously locked onto at the position where the focus was stopped in step S802 in the one-shot AF processing.

In step S805, the camera control unit 117 determines whether the release button was fully pressed by the user and then the shooting operation was instructed. In a case where it was determined that the shooting operation was instructed, the processing advances to step S806, and otherwise, the processing advances to step S807.

In step S806, still image is shot.

In step S807, the camera control unit 117 determines whether the shooting preparation operation was instructed by the user. In a case where it is determined that the shooting preparation operation is instructed (applies to an operation for maintaining the shooting preparation operation and an operation for switching from the shooting operation to the shooting preparation operation), the processing advances to step S808, and otherwise, the processing advances to step S810.

In step S808, the subject transfer determination described later is performed. The subject transfer determination is described later in detail.

In step S809, the servo AF processing in which the focus adjustment is continuously performed on the lock-on subject is performed. Then, the processing returns to step S805. If the user continues to fully press down on the release button in order for the shooting operation to continuously be executed, still images will continuously be shot.

After the camera is turned on and it is determined that a release button has not been operated and that the state is in live view operation (a shooting standby state) in steps S801 and S807, the camera control unit 117, in step S810, releases the lock-on of the subject.

In step S811, in a case where the lock-on time is being measured, the measurement is ended.

Next, subject transfer determination processing according to the present embodiment is described with reference to the flowchart in FIG. 9. This determination processing is executed in step S808 every time the operation in step S806 to step S809 in FIG. 8 is performed.

In step S901, the camera control unit 117 calculates, regarding a plurality of focus detection frames in a predetermined range of the image capturing screen, a defocus amount to be used in the close-range subject presence count (time) determination or the same subject determination.

In step S902, the camera control unit 117 determines whether the predetermined time has elapsed from the lock-on. In a case where it is determined that the time has not elapsed, the processing advances to step S903 and in a case where it is determined that the time has elapsed, the processing advances to step S911.

In step S903, a ratio (close-range ratio) of the focus detection frame count, in which a subject that is at a closer range than the current lock-on distance is present, to the total focus detection frame count is calculated based on the defocus amount calculated in step S901. At this time, only a frame with high defocus amount reliability may be targeted.

In step S904, the camera control unit 117 determines whether the ratio calculated in step S903 is equal to or greater than a predetermined value. In a case where the ratio was determined to be equal to or greater than the predetermined value, the processing advances to step S905, and otherwise, the processing advances to step S906.

In step S905, the camera control unit 117 counts, in a close-range subject presence determination performed for every execution of steps S806 to S809 in FIG. 8, the number of times or length of time over which it is determined that there is presence. An example of a count according to a determination of a close-range subject presence count (or time) is illustrated in FIG. 10.

In FIG. 10, in the third, sixth, seventh, eighth, and ninth shootings of the continuous shooting, the ratio of the number of focus detection frames, in which a subject is present at a closer range than the current lock-on distance, to the number of frames is equal to or greater than the threshold. Here, regarding the close-range subject presence count (or time), at each of the third, sixth, seventh, eighth, and ninth shootings, the count is incremented by 1. Therefore, if the threshold for the close-range subject presence count (or time) is, for example, 5, the close-range subject presence count (or time) reaches 5 or greater in the ninth shooting thereby becoming equal to or greater than the threshold. In the present embodiment, if the close-range subject presence count (or time) is equal to or greater than the threshold in steps S911 to S913 described later, the close-range subject is determined to be the correct AF target, and then the AF lock-on is changed to the new subject without performing the same subject determination.

Returning to FIG. 9, in step S906, the camera control unit 117 determines whether the count value in step S905 is equal to or greater than a predetermined value. In a case where the ratio was determined to be equal to or greater than the predetermined value, the processing advances to step S911, and otherwise, the processing advances to step S907.

In step S907, the camera control unit 117 performs the same subject determination. In FIG. 11, an example in which a defocus amount difference between the lock-on subject (current subject) and the new subject is calculated and then whether the subjects are the same is determined based on whether the difference is equal to or greater than the predetermined threshold is illustrated. This same subject determination is the same as the same subject determination previously described in the conventional servo AF.

In FIG. 11, the defocus amount difference between the current subject and the new subject exceeds the defocus amount threshold in the sixth continuous shooting. Thus, by the determination in the sixth shooting, it is determined that the defocus amount difference between the current subject and the new subject is equal to or greater than the threshold and thus the subjects are not the same. Then, as in step S909 described later, in a period until a preset same subject determination time elapses from the time of this sixth shooting, the lock-on is released from the current subject, and then when the set same subject determination time has elapsed, the lock-on is changed to the new subject.

Returning to FIG. 9, in step S908, the camera control unit 117 determines whether the subjects are the same based on a result of step S907. In a case where the subjects were determined to be the same, the processing advances to step S910, and otherwise, the processing advances to step S909.

In step S909, the camera control unit 117 releases the lock-on and stops driving the lens since the current locked-onto subject is not the same as the new subject.

In step S910, the camera control unit 117 keeps the lock-on and continues to track the current locked-onto subject is the same as the new subject.

If a preset lock-on duration has elapsed in step S902 or the close-range subject presence count (or time) is determined to be equal to or greater than the predetermined value in step S906, measurement of the lock-on time is ended in step S911 in order to lock onto the new subject.

Similarly, in step S912, the camera control unit 117 resets the close-range subject presence count (time).

In step S913, the camera control unit 117 changes the lock-on target from the current subject to the new subject and locks onto the new subject.

FIG. 12 is a diagram comparing the subject transfer determination of the present embodiment and conventional subject transfer determination. Conventionally, the lock-on is changed after the determination as to whether or not the current lock-on subject and the new subject are the same subject. In contrast to this, in the present embodiment, even if it is during the set same subject determination time, if the close-range subject presence count (or time) is equal to or greater than the predetermined value, the lock-on is changed to the new subject. By this, even in a case where the focus ends up on the background in the AF, the focus can be quickly adjusted to the correct subject.

Note that each of the controls described above to be performed by the camera control unit 117 may be performed by a single hardware component or the control of the entire apparatus may be performed by a plurality of hardware components (e.g., a plurality of processors and circuits) allocating the processing.

Note that although, in the embodiment described above, an example of a case where the present invention is adopted in an image capturing system is explained, the present invention is not limited to this example and adoption is possible as long as the image capturing apparatus is able to perform the continuous still image shooting by AF tracking. In other words, the present invention may be adopted in personal computers, PDAs, mobile telephone terminals, game devices, or the like.

Also, the present invention may be adopted not only in an image capturing apparatus main body but also in a control apparatus which communicates with an image capturing apparatus (including a network camera) via wired or wireless communication and remotely controls the image capturing apparatus. Apparatuses that remotely control the image capturing apparatus are apparatuses such as smartphones, tablet PCs, and desktop PCs. Based on the operation performed on the control apparatus side or the processing performed on the control apparatus side, it is possible to remotely control the image capturing apparatus by notifying the image capturing apparatus of commands for performing various operations and settings from the control apparatus side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-192135, filed Oct. 21, 2019 which is hereby incorporated by reference herein in its entirety.

What is claimed is:

1. An image capturing apparatus comprising:
   an image sensor configured to be able to output an image capturing signal, in which a subject image is captured, and a focus detection image signal, for which light that has passed through regions with different exit pupils of an imaging optical system has been photoelectrically converted; and
   at least one processor or circuit configured to function as:
   a focus detection unit configured to set, in the output signal of the image sensor, a focus detection range for performing focus detection, and to perform focus detection, in each of a plurality of focus detection frames in the focus detection range, based on the focus detection image signal; and
   a focus adjustment unit configured to perform a focus adjustment, during a shooting preparation operation and a shooting operation, based on an output of the focus detection unit, for tracking a subject,
   wherein the focus detection unit makes the focus detection range for tracking the subject and performing the focus adjustment for the subject during the shooting operation broader than a range of a focus detection display frame indicating a focus detection range displayed in a display unit and makes the focus detection range during shooting preparation operation within the range of the focus detection display frame.

2. The image capturing apparatus according to claim 1, wherein the focus detection unit obtains, in each of a plurality of focus detection frames in the focus detection range, a defocus amount of a subject.

3. The image capturing apparatus according to claim 1, wherein the focus detection unit makes, during the shooting operation, the size of each of a plurality of focus detection frames in the focus detection range greater than that of during the shooting preparation operation so as to broaden the focus detection range.

4. The image capturing apparatus according to claim 1, wherein the focus detection unit makes, during the shooting operation, the number of a plurality of focus detection frames in the focus detection range larger than that of during the shooting preparation operation so as to broaden the focus detection range.

5. The image capturing apparatus according to claim 1, wherein the focus detection unit sets, during shooting preparation operation, the focus detection range to be the same size as a range of a focus detection display frame indicating a focus detection range displayed in the display unit.

6. The image capturing apparatus according to claim 1, wherein the focus detection unit sets, in shooting standby before shooting preparation operation is performed, the focus detection range to the same size as the focus detection range during shooting preparation operation.

7. A method for controlling an image capturing apparatus including an image sensor configured to be able to output an image capturing signal, in which a subject image is captured, and a focus detection image signal, for which light that has passed through regions with different exit pupils of an imaging optical system has been photoelectrically converted, the method comprising:
  setting, in the output signal of the image sensor, a focus detection range for performing focus detection and performing focus detection in each of a plurality of focus detection frames in the focus detection range, based on the focus detection image signal; and
  performing a focus adjustment, during a shooting preparation operation and a shooting operation, based on an output of the focus detection, for tracking a subject,
  wherein in the focus detection, the focus detection range for tracking the subject and performing the focus adjustment for the subject during the shooting operation is set to be broader than a range of a focus detection display frame indicating a focus detection range displayed in a display unit and the focus detection range during shooting preparation operation is set to be within the range of the focus detection display frame.

8. A non-transitory computer-readable storage medium storing a program for causing a computer to execute each step of a method for controlling an image capturing apparatus including an image sensor configured to be able to output an image capturing signal, in which a subject image is captured, and a focus detection image signal, for which light that has passed through regions with different exit pupils of an imaging optical system has been photoelectrically converted, the method comprising:
  setting, in the output signal of the image sensor, a focus detection range for performing focus detection and performing focus detection, in each of a plurality of focus detection frames in the focus detection range, focus based on the focus detection image signal; and
  performing a focus adjustment, during a shooting preparation operation and a shooting operation, based on an output of the focus detection, for tracking a subject,
  wherein in the focus detection, the focus detection range for tracking the subject and performing the focus adjustment for the subject during the shooting operation is set to be broader than a range of a focus detection display frame indicating a focus detection range displayed in a display unit and the focus detection range during shooting preparation operation is set to be within the range of the focus detection display frame.

* * * * *